United States Patent Office 2,957,899
Patented Oct. 25, 1960

2,957,899
ALKALINE HYDROLYSIS OF CYANOALKYL-SILOXANES

William T. Black, Buffalo, Donald L. Bailey, Kenmore, and Victor B. Jex, Snyder, N.Y., assignors to Union Carbide Corporation, a corporation of New York No Drawing. Filed Oct. 12, 1956, Ser. No. 615,468

3 Claims. (Cl. 260—448.2)

This invention relates, in general, to the synthesis of novel organosilicon compounds. More particularly, the invention contemplates the provision of new organosiloxane derivatives containing, among other possible functional groups, a carboxy or carboalkoxy functional group which is linked to the silicon atom or atoms through an aliphatic hydrocarbon substituent in a position removed from the silicon nucleus by at least two carbon atoms of the aliphatic linkage, i.e., beta-substituted or further along a silicon-bonded polymethylene chain. The invention further contemplates the provision of unique processes for producing compounds of the general class described as well as useful derivatives of such compounds.

Heretofore, organosilicon compounds containing silicon-substituted carboxylated radicals have been produced by reacting, in the presence of peroxide catalyst, unsaturated aliphatic or cyclic monoesters and diesters with halogen-, hydrocarbon-, or halogenated hydrocarbon-substituted silanes containing at least one silanic hydrogen bond, to provide a carboxylated silane which is then hydrolyzed to produce a corresponding siloxane. While the foregoing technique has been applied largely in connection with the cyclic esters, it has been postulated by at least some investigators that the process is unsatisfactory when applied to aliphatic and cyclic unsaturated esters in which the unsaturated linkage is so positioned that a functional carbonyl group will be substituted less than three carbon atoms from the silicon nucleus following the ester-silane reaction, as would be the case, for example, when esters of acrylic acid are employed as starting materials. That is to say, it would appear from available literature reports that the process is inherently limited to the production of siloxanes in which the carboxy or carboalkoxy substituents are positioned no closer to the silicon atom than the gamma carbon atom of the silicon-bonded connecting chain or ring structure.

The present invention is based, in part, upon our discovery that siloxane compounds containing a carboxy substituent attached to the silicon atom through a polymethylene linkage, including the ethylene linkage, may be produced by the direct alkaline hydrolysis of cyanoalkyl siloxanes, whereby the cyano group (—CN) of the cyanoalkyl substituent is converted to the desired carboxy substituent, as represented in general by the following skeletal equations:

(I) $[NC(CH_2)_aSi\equiv]_n + NaOH + H_2O \rightarrow$
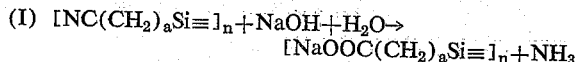
(II) $[NaOOC(CH_2)_aSi\equiv]_n + [H]^+ \rightarrow$
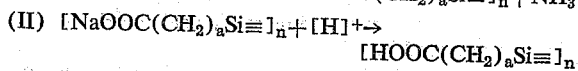

wherein (a) represents any integer from 2 to 10 inclusive, and (n) represents any whole number greater than one.

The novel siloxane polymers obtainable by the process of the invention may be represented in general by the following unit formula:

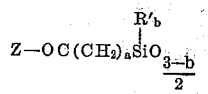

wherein Z is a member selected from the group consisting of the alkali metal-oxy radicals (MO—) from alkali metal hydroxides, chlorine, and hydroxy, alkoxy and aryloxy radicals; R' represents monovalent hydrocarbon radicals, including both alkyl and aryl radicals; (a) is an integer from 2 to 10 inclusive; and (b) has a value from 0 to 2 inclusive.

While the process of the invention is limited to the production of polymeric materials, it is equally applicable to both the cyanoalkylsilanes and cyanoalkyl siloxanes as starting materials; the former being converted initially to polymeric form by conventional hydrolysis procedures. Thus, suitable cyanoalkyl monomeric and polymeric starting materials for use in the process of the invention may be represented in general by the following formulae:

(A)
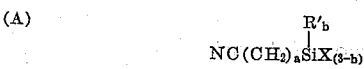

and (B)
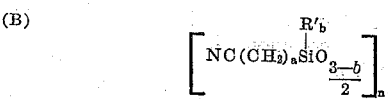

wherein R' represents any monovalent hydrocarbon radical, including both alkyl and aryl radicals; X represents halogen or alkoxy; (a) is any integer from 2 to 10 inclusive; (b) in Formula A has a value from 0 to 3 inclusive, and in Formula B a value from 0 to 2 inclusive; and (n) in Formula B represents any whole number greater than one. Cyanoalkyl compounds of the general class defined above and processes for their production are described and claimed in copending U.S. applications Serial No. 555,201, filed jointly by Victor B. Jex and J. E. McMahon on December 23, 1955, and Serial No. 555,203, filed jointly by Victor B. Jex and R. Y. Mixer, also on December 23, 1955.

In general, a large excess of base is required to promote the hydrolysis of the cyano group of the cyanoalkyl-siloxanes, and we prefer to operate with a mutual solvent for the polymer and water in order to promote a rapid and complete reaction. We have found that a reaction temperature of approximately 100° C. provides most satisfactory results, although higher or lower temperatures can be employed. Neutralization of the polymeric alkali metal salts (Equation II) to obtain the free acid polymers can be effected with any mineral acid but in actual practice we prefer to employ hydrochloric acid for this purpose because of its ease of removal from the reaction system, as compared, for example, with sulfuric acid.

The alkaline hydrolysis reaction is generally effected by the addition of the cyanoalkyl siloxane to a water solution of the alkali metal hydroxide, preferably sodium hydroxide, and any solvent that may be employed.

The resulting mixture is then heated to reflux for a suitable period during which time some ammonia gas is evolved. A vacuum is then drawn on the reaction flask and the dissolved ammonia is evaporated along with a portion of the water. The sodium salts of the carboxypolymethylene siloxanes are water soluble and remain in solution. The water solution of the sodium salt is then added slowly with stirring to a solution of hydrochloric acid of concentration about ten percent, and a solvent such as acetone, diethyl ether, or an alkanol may be employed. The resulting acid solution is then extracted with diethyl ether in conventional manner, and the ether solution is washed with water until the washings are returned nearly neutral to pH paper. The ether is then removed by vacuum evaporation, and a small amount of toluene may be added to the reaction mixture and evaporated-off under vacuum such that any water remaining after the ether extraction will be carried over with the toluene in the form of an azeotrope.

The silicone acids prepared in this manner can be reacted with an inorganic acid chloride to produce the corresponding silicone acid chlorides which are found to undergo reactions typical of the organic acyl halides in general. We prefer to employ thionyl chloride ($SOCl_2$) as the acid chloride reagent in this reaction since the silicone acyl chlorides are thus obtained in good yields and can be purified readily. This reaction may be represented by the following skeletal equation:

(III)

$$[\equiv Si(CH_2)_aCOOH]_n + SOCl_2 \rightarrow [\equiv Si(CH_2)_a-COCl]_n + SO_2 + HCl$$

wherein (*a*) and (*n*) have the same meaning as assigned above. Of course, a similar replacement reaction could be effected with the silicone alkali metal salts (Equation I).

The carboalkoxy functional siloxanes of the invention are obtained by reaction of the polymeric acyl chlorides with an aliphatic alcohol; the reaction preferably being conducted at the refluxing temperature of the alcohol employed, usually at temperatures within the range 50–110° C. for the more common aliphatic alcohols such as methanol, ethanol, propanol, butanol, etc., but higher temperatures can be employed, with recovery of the siloxane ester preferably being effected by conventional vacuum distillation techniques.

The carboxy- and carboalkoxy-functional polysiloxanes produced by the process of the invention are extremely useful in the production of a variety of carboxy- and carboalkoxy-modified silicone and organic products. Thus, they may be copolymerized with other siloxanes of the general unit formulation:

(C)
$$R''_b SiO_{\frac{4-b}{2}}$$

wherein (*b*) has a value from 1 to 3 inclusive, and R'' represents any monovalent hydrocarbon radical; to yield a variety of copolymeric siloxanes. The copolymerizations can be effected in conventional manner by equilibration in the presence of a siloxane bond-rearranging catalyst such as sulfuric acid.

A typical equilibration of the general class described is that represented by the production of carboalkoxy-polymethylenealkylsiloxy-modified silicone oils from the corresponding cyclopolysiloxanes, which are obtained by the alkaline hydrolysis of a cyanopolymethylenealkylsiloxane cyclic polymer followed by conversion of the hydrolyzate to the acyl chloride and ultimately to the carboalkoxy-substituted polymer by reaction with an aliphatic alcohol, with other silicone cyclics and a suitable end-blocker in the presence of acid catalysts, as represented, for example, by the equilibration of gamma-carbethoxypropylmethylsiloxane cyclic tetramer, dodecamethylpentasiloxane, dimethylsiloxane cyclic tetramer and sulfuric acid, to yield the carbethoxy-modified dimethylsilicone oil represented by the equation:

(IV)

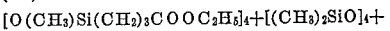
[O(CH_3)Si(CH_2)_3COOC_2H_5]_4 + [(CH_3)_2SiO]_4 +

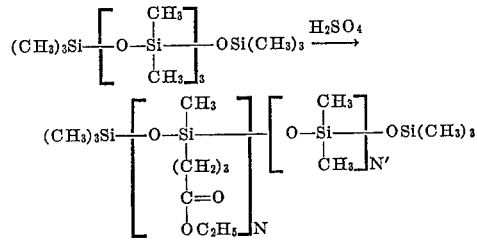

Of course, depending upon the ratio of reactants employed, one may obtain a variety of oils of varying molecular weights and percentages of carboalkoxy substituents, and oils containing phenyl, ethyl, vinyl and other groups may be prepared in a similar manner. Alternatively, in the absence of the end-blocking polymer one may prepare a variety of silicone gum stock polymers.

The carboxy-functional polysiloxanes of the invention may be subjected to direct esterification with any of the aliphatic primary, secondary or tertiary alcohols, or hydroxy-endblocked polypropylene or polyethylene oxide polymers, or aromatic hydroxy compounds such as phenol, in the presence of an acid esterification catalyst, to obtain carboalkoxy - functional derivatives, among others. Alternatively, the carboalkoxy-substituted siloxanes of the invention may be transesterified by treatment with organic alcohols and hydroxy compounds of the general class described, in the presence of an acid transesterification catalyst, to produce a variety of modified silicone esters. Any strong acid may be used to catalyze these reactions, but we prefer to employ acids such as trifluoroacetic, perfluoroglutaric, or any perfluoro organic acid or hydrochloric acid, since such acids are readily removable from the reaction system. These reactions may be represented in general by the following skeletal equations:

(V)

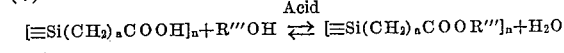
$$[\equiv Si(CH_2)_aCOOH]_n + R'''OH \rightleftharpoons^{Acid} [\equiv Si(CH_2)_aCOOR''']_n + H_2O$$

and (VI)

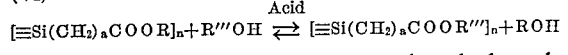
$$[\equiv Si(CH_2)_aCOOR]_n + R'''OH \rightleftharpoons^{Acid} [\equiv Si(CH_2)_aCOOR''']_n + ROH$$

wherein R and R''' represent monovalent hydrocarbon radicals, and (*a*) and (*n*) having the same meanings as previously assigned above.

The novel siloxanes of the invention have been employed in the production of a variety of carboxy- and carboalkoxy-modified silicones and organic derivatives of the types represented by the foregoing general equations, including among others, for example, silicone oils which are easily emulsified, oxidation resistant silicone-alkyd resins, ultra-violet absorbing aromatic amides, silicone elastomers, and esters of polyalkene glycols which are found to be good lubricants. Certain of these products are included within the examples which are presented hereinafter for purposes of illustrating the general utility of the end-products of the present invention. Reference should be had, also, to our copending U.S. applications Serial No. 615,492, filed of even date with this application, wherein we have described in greater detail, and claimed, the unique carboxy- and carboalkoxy-substituted beta-isomers of the compounds herein claimed together with the inorganic and silicone derivatives of such beta-isomers, and Serial No. 615,499, also filed of even date with this application, wherein we have described and claimed certain of the cyclic siloxane polymers of the invention together with their corresponding cyclic acyl chloride derivatives, as prepared by various other syntheses in addition to the alkaline hydrolysis technique of the present invention.

The chemistry of certain of the basic processes of the invention as described hereinbefore, as well as the end-products derived thereby, are summarized graphically within the following reaction chart wherein silicon trifunctional compounds have been depicted for purposes of illustration on a unit formula basis:

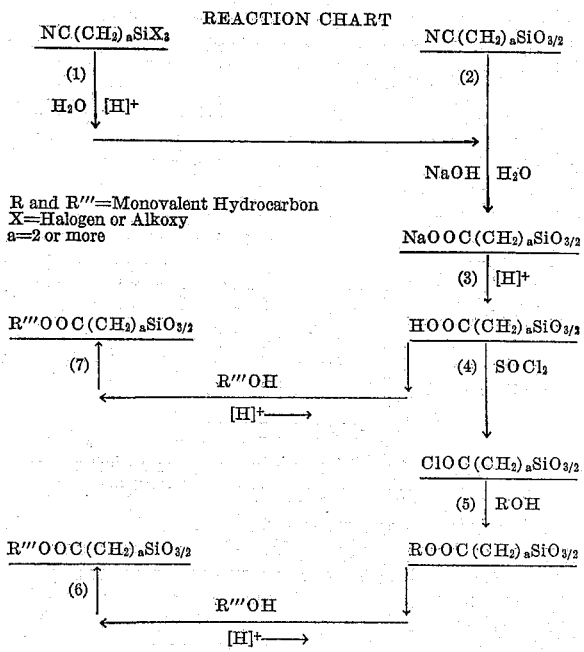

REACTION CHART

R and R'''=Monovalent Hydrocarbon
X=Halogen or Alkoxy
a=2 or more

It is believed that the invention may be best understood by reference to the following specific examples which describe the preparation of typical compounds in accordance with the foregoing principles and procedures:

EXAMPLE I

*Preparation of beta-carboxyethylpolysiloxane from beta-cyanoethyltrichlorosilane by alkaline hydrolysis (chart reactions 1, 2 and 3)*

Beta-cyanoethyltrichlorosilane was dissolved in 800 milliliters of isopropyl ether. Ice, in amount 600 grams, was added slowly to the ether solution with constant stirring. Hydrogen chloride was evolved and a white precipitate formed. After the addition was complete, the mixture was stirred for one-half hour and 400 milliliters of a 32.5% sodium hydroxide solution was added and the stirring continued until all solid matter dissolved in the aqueous layer. The aqueous layer was then separated from the ether layer, cooled to 10–20° C., and concentrated hydrochloric acid was added with stirring until the solution was acidified. A heavy white precipitate formed. The precipitate was filtered, washed and dried. After drying the material was powdered and washed four times with distilled water. The wash water was tested with $AgNO_3$ and found to be free of chloride. The polymer was diced under vacuum and its structure confirmed by infrared analysis. The yield was 47.39 grams or 86.5 percent of theoretical.

EXAMPLE II

*Preparation of gamma-carboxypropylmethylsiloxane from gamma-cyanopropylmethylpolysiloxane by alkaline hydrolysis (chart reactions 2 and 3)*

A diethyl ether solution of 60 grams of gamma-cyanopropylmethylpolysiloxane, prepared by an ether-ice hydrolysis of the corresponding chlorosilane, was refluxed with a water solution of 30 grams of sodium hydroxide for forty-eight (48) hours within a two-liter flask fitted with a reflux condenser. The ether was then distilled off leaving an oily layer on the surface of the water. The mixture was refluxed for an additional two hours which resulted in dissolving most of the oily layer. There remained but a very small amount of the oily layer which was separated. The water solution was then acidified with an excess of hydrochloric acid which caused the desired carboxy silicone to separate as an oil. The oil was dissolved in diethyl ether, and the water layer was extracted twice with ether. The combined ether solution was stripped under vacuum yielding a heavy oil. A sample of the oil, which was confirmed as being the desired compound, gave the following analysis:

|  | C | H | Si |
|---|---|---|---|
| Calculated _____percent__ | 41.2 | 6.9 | 19.2 |
| Found _____do____ | 42.0 | 8.6 | 17.6 |
| Neut. Eq. _____ | Theoretical—146 | Found—142 | |

EXAMPLE III

*Preparation of the acyl chloride of gamma-carboxypropylmethylpolysiloxane (chart reaction 4)*

Gamma-carboxypropylmethylsiloxane cyclic tetramer (Example V), in amount 30 grams, was placed in a one-liter flask fitted with a reflux condenser, together with 100 cubic centimeters of toluene and 73.5 grams (0.718 mole-200% excess) of thionyl chloride. The mixture was heated on a steam bath for four (4) hours. The solvent and excess thionyl chloride was then stripped off under vacuum. The residue material was a free-flowing oil. Infrared analysis of the material indicated that no OH groups were present and a shift in the carbonyl band which was expected for the acid chloride. A subsequent repeat experiment yielded ninety-five percent (95%) of the theoretical. Elemental analysis of the compound gave the following results:

|  | C, percent | H, percent | Si, percent | Cl, percent | Saponification Number |
|---|---|---|---|---|---|
| Calculated | 36.5 | 5.5 | 17.0 | 21.6 | 682 |
| Found | 35.9 | 5.9 | 17.0 | 21.7 | 698 |

EXAMPLE IV

*Preparation of gamma-carbethoxypropylmethylsiloxane cyclic tetramer by reaction of acyl chloride with ethanol (chart reaction 5)*

The acid chloride obtained as outlined in the preceding example, in amount 30 grams, was refluxed with absolute ethanol (11.59 grams) for two hours within a one-liter flask fitted with a reflux condenser. The excess ethanol was then removed by vacuum evaporation, and the product distilled through a "Hickman" molecular still. A fraction (10.6 grams) was collected between 200 and 300° C. at 200 microns pressure which had a refractive index ($n_D{}^{25}$) of 1.4461 which compared favorably with the value obtained with quantities of gamma-carbethoxypropylmethylsiloxane cyclic tetramer produced in accordance with the process of our copending application Serial No. 615,492. The original material was found to contain both the trimer and tetramer, but was particularly rich in tetramer. The ultimate yield of tetramer amounted to 33.4% of theoretical. The total yield of distillables was 58.2%, consisting essentially of cyclics of gamma-carbethoxypropylmethylsiloxane.

EXAMPLE V

*Preparation of gamma-carboxypropylmethylsiloxane cyclic tetramer by alkaline hydrolysis of gamma-cyanopropylmethylsiloxane cyclic tetramer (chart reactions 2 and 3)*

Gamma-cyanopropylmethylsiloxane cyclic tetramer (348 grams) was dissolved in 300 cubic centimeters of absolute alcohol within a two-liter, round-bottomed flask fitted with a reflux condenser. Sodium hydroxide (1250 cubic centimeters of a 4% solution in water) was then added, and the mixture refluxed for 68 hours. The ethanol and 100 cubic centimeters of water were then distilled off. The cool water solution was extracted with diethylether to remove any non-reacted material. The water solution was then acidified with hydrochloric acid (10%) and extracted with ether. This ether solution was then washed with distilled water until it was almost neutral. The ether solution was then dried over anhydrous calcium sulfate for twenty (20) hours. The solution was then filtered, and the ether removed by vacuum evaporation. The structure of the desired tetramer was confirmed by infrared analysis. The material had an acid titer equivalent of 159.7 as compared with the theoretical of 146. The yield represented 84.7% of theoretical.

UTILITY REACTIONS

The following additional examples are offered for purposes of illustrating other reactions and select uses of typical compounds of the invention.

EXAMPLE VI

*Preparation of bis (trimethylsiloxy)-gamma-carboxypropylmethylsilane and bis(trimethylsiloxy)-bis(gamma-carboxypropylmethyl) disiloxane by equilibration of gamma-carboxypropylmethylsiloxane cyclic tetramer with hexamethyldisiloxane in the presence of sulfuric acid catalyst*

Hexamethyldisiloxane, in amount 50 grams, and gamma-carboxypropylmethylsiloxane cyclic tetramer (14.6 grams) were admixed within a 500 cubic centimeter round-bottomed flask fitted with a stirrer. The mixture was then heated to 80° C. on a steam bath. Sulfuric acid catalyst (1.5 grams) was then added with stirring, and the mixture was equilibrated at 80° C. for three hours with stirring. The solution was then diluted with distilled water and extracted with diethyl ether. The ether solution was washed free of sulfuric acid, and the ether then evaporated off. The siloxane was then dissolved in dilute sodium hydroxide (10%) to form the sodium salt. The basic solution was extracted with diethyl ether to remove any unreacted hexamethyldisiloxane, and the ether layer was discarded. The water solution was then dropped slowly into a solution of 10% hydrochloric acid and dioxane to give the free acid. The solution was then extracted with diethyl ether and the ether solution washed free of hydrochloric acid. The ether and water were then stripped off under vacuum, yielding an oil which was soluble in $(Me_2SiO)_4$.

The oil was distilled through a one-plate column yielding a fraction of boiling point 100–160° C. at 200 microns pressure. The material had a neutralization equivalent of 288 (theoretical for the desired compound is 308). An infrared analysis confirmed its structure to be:

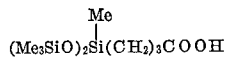

The yield was 26.3% based on gamma-carboxypropylmethylsiloxane cyclic tetramer. The residue weighed 12.05 grams, and infrared analysis of the same confirmed its structure to be:

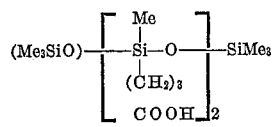

The resulting low molecular weight siloxanes, trimethylsiloxy end-blocked, and containing one and two carboxypropylmethylsiloxy groups per molecule, are extremely useful products for the production of polyester resins, and as components for the production of silicone oils containing carboxyalkylsiloxy groups.

EXAMPLE VII

*Preparation of a dimethylsilicone oil containing five percent by weight of gamma-carbethoxypropylmethylsiloxy units*

Octamethylcyclotetrasiloxane, in amount 87.3 grams, dodecamethylpentasiloxane, in amount 7.7 grams, and gamma-carbethoxypropylmethylsiloxane cyclic tetramer, in amount 5.0 grams, were admixed within a 500 cubic centimeter, three-necked, round-bottomed flask fitted with reflux condenser, thermometer and stirrer. The mixture was heated to 60–80° C. on a steam bath and one percent by weight sulfuric acid was added with stirring. The heating and stirring were continued for about three hours. The sulfuric acid was then neutralized with sodium bicarbonate. The silicone was dissolved in di-isopropyl ether and washed with distilled water until neutral to pH paper. The ether and any water remaining were removed by vacuum evaporation at 150° C. Infrared analysis of the oil showed absorption in the region expected for a dimethylsilicone oil containing gamma-carbethoxypropylmethylsiloxy units. The viscosity of the oil was 79 centistokes at 25° C.

EXAMPLE VIII

*Preparation of a silicone elastomer containing one percent gamma-carboxypropylmethylsiloxy units*

Dimethylsiloxane cyclic tetramer, in amount 100 grams, carboxypropylmethylpolysiloxane, in amount 1 gram, and 0.08 gram fuming sulfuric acid (catayslts) were mixed in a closed six-ounce bottle. The materials polymerized very slowly until after one week at room temperature, a product of consistency comparable with conventional silicone gums for elastomer preparation was obtained.

This material, in amount 100 grams, was compounded on a small two-roll rubber mill, with 30 grams of "Hi Sil" X–303 grade reinforcing silica, and 2 percent by weight of "Cadet" brand benzoyl peroxide curing catalyst. The compound was mold-cured for fifteen (15) minutes at 240° F. A silicone rubber was obtained with the following measured properties:

Tensile Strength (p.s.i.) _____ 593
Elongation (percent) _____ 300
Set at break _____ nil
Hardness (Shore A) _____ 33

EXAMPLE IX

*Preparation of a dimethylsilicone oil containing gamma-carboxypropylmethylsiloxy units (see Equation IV)*

Octamethylcyclotetrasiloxane, in amount 165.3 grams, gamma-carboxypropylmethylsiloxane cyclic tetramer, in amount 8.7 grams, and dodecamethylpentasiloxane (7.7 grams) were placed within a one-liter, three-necked flask fitted with a stirrer and thermometer. The carboxyalkylsiloxane was not miscible with the other siloxanes, and, therefore, the mixture was heated to 50°–90° C. on a steam bath with stirring. Sulfuric acid, in amount 7.5 percent by weight, was then added, and the heating and stirring continued for three hours during which time the carboxyalkylsilicone was equilibrated into the dimethylsiloxanes. The solution was then diluted with distilled water to dilute the catalyst. The siloxane was then dissolved in diethyl ether and washed with distilled water until the water washings were neutral to pH paper. The ether was then removed by vacuum evaporation. Benzene was then added, and the small amount of water present was removed as an azeotrope with benzene by a vacuum evaporation. A viscous oil was obtained. The viscosity was found to be 443 cs. at 25° C., the saponification number was 17, and the molecular weight 3679 (cryoscopic). The saponification number indicates 4.3% carboxy-containing siloxy units.

EXAMPLE X

*Preparation of a dimethylsilicone oil containing gamma-carboxypropylmethylsiloxy units (see Equation IV)*

Octamethylcyclotetrasiloxane, in amount 14.45 grams, gamma-carboxypropylmethylsiloxane cyclic tetramer, in amount 75 grams, and dodecamethylpentasiloxane (10.55 grams) were mixed within a one-liter, round-bottomed flask fitted with a stirrer and thermometer, and heated to 80° C. on a steam bath with stirring. Sulfuric acid, in amount 1.5 percent by weight, was then added, and the heating and stirring was continued for three hours. The solution was allowed to cool to room temperature and 200 cubic centimeters of distilled water were added, and the mixture stirred for 15 minutes. The silicone was then dissolved in diethyl ether and washed with distilled water until the water washings were neutral to pH paper. The ether was then evaporated off and 150 cubic centimeters of toluene were added. The toluene and any water present were then removed by vacuum stripping. The residue was a thick viscous oil having a viscosity of 26,000 centipoise seconds at 25° C.

The oil (5 grams) was mixed with ten drops of diethylamine and shaken with an excess of water. An emulsion formed immediately and did not separate within a 36 hour period.

A similar quantity of oil as above was mixed with ten drops of morpholine and shaken with an excess of water. The resulting emulsion did not separate within a 36 hour period.

In contrast to these results, conventional silicone oils require special emulsifying agents and exacting methods of formulation to produce stable emulsions.

EXAMPLE XI

*Esterification of gamma-carboxypropylmethylsiloxane cyclic acid chloride with "Ucon LB-40"*

The acid chloride of gamma-carboxypropylmethylsiloxane cyclic as prepared in Example III, in amount 27 grams, was reacted with "Ucon LB-40" (a butoxypolypropylene glycol, $C_4H_9O(C_3H_6O)_xH$, of approximately 300 molecular weight), in amount 50 grams. The reaction was effected by heating a solution of the above materials in 100 cubic centimeters of toluene within a one-liter flask on a steam bath for three hours. There was a nitrogen sparge for the last hour. The solution was then refluxed for an additional two hours. The toluene was then removed by vacuum evaporation yielding 64.7 grams of an oil with a viscosity of 73.0 centistokes at 25° C. The yield was 97.4 percent of the theoretical. The oil did not give a test for chloride. Analysis of the oil showed it to contain 8.6% silicon.

The oil was tested for load-carrying ability in accordance with the Falex test described by L. B. Sargent et al. in their article entitled "Laboratory Evaluation of E.P. Gear Oils," Lubricating Engineering, vol. 5, October 1949. The failure load was 1100 pounds which indicates a high degree of lubricity.

EXAMPLE XII

*Esterification of gamma-carboxypropylmethylsiloxane cyclic tetramer With "Ucon LB-40"*

Gamma-carboxypropylmethylsiloxane cyclic tetramer, in amount 43.8 grams, "Ucon LB-40" (a Ucon of about 300 molecular weight containing a terminal OH group), in amount 108 grams (20% excess), 2.0 grams of trifluoroacetic acid, and 400 cubic centimeters of toluene were charged into a one-liter flask fitted with a Dean Stark moisture trap and refluxed at 120° C. for 24 hours. At the end of this time, the trifluoroacetic acid was neutralized and the material stripped under vacuum. The residue weighed 81 grams representing a 66 percent yield. The compound had a viscosity of 28 centistokes at 25° C.

We claim:

1. Process for the production of polysiloxanes represented by the unit formula:

(A) 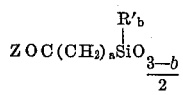

$$ZOC(CH_2)_aSiO_{\frac{3-b}{2}}^{R'_b}$$

wherein Z is a member selected from the group consisting of alkali metal-oxy radicals (MO—) from alkali metal hydroxides, chlorine, and hydroxy, alkoxy and aryloxy radicals; R' is a member selected from the group consisting of phenyl and lower alkyl radicals; (a) is an integer from 2 to 10 inclusive; and (b) has a value from 0 to 1 inclusive; that comprises, forming an admixture of a cyanoalkyl siloxane as represented by the unit formula:

(B) 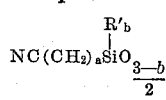

$$NC(CH_2)_aSiO_{\frac{3-b}{2}}^{R'_b}$$

wherein R', (a) and (b) have the same meaning as assigned above with an aqueous alkaline reaction medium and a liquid organic compound selected from the class consisting of the lower dialkyl ethers and lower alkanols in which said cyanoalkyl siloxane is soluble, heating the admixture to cause the siloxane and aqueous alkaline medium to react to effect hydrolysis of the cyano group of the cyanoalkyl siloxane, and treating the resulting hydrolyzate to recover the desired polymeric compound.

2. The process as claimed in claim 1 wherein the hydrolyzate is treated for the production of a carboalkoxyalkyl-substituted siloxane, and further comprising the steps of copolymerizing the siloxane in the presence of an acid catalyst with at least one siloxane selected from the group consisting of siloxanes represented by the unit formula:

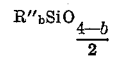

$$R''_bSiO_{\frac{4-b}{2}}$$

wherein R" is a member selected from the group consisting of phenyl and lower alkyl radicals, and (b) has a value from 1 to 3 inclusive; and separating and recovering the copolymeric siloxane thus produced.

3. The process as claimed in claim 2 wherein the copolymerization reaction mixture includes a trimethylsiloxy end-blocked siloxane polymer.

References Cited in the file of this patent

UNITED STATES PATENTS

| | | |
|---|---|---|
| 2,469,888 | Patnode | May 10, 1949 |
| 2,589,446 | Sommer | Mar. 18, 1952 |
| 2,591,736 | Sommer | Apr. 8, 1952 |
| 2,610,199 | Sommer | Sept. 9, 1952 |
| 2,672,474 | Sommer | Mar. 16, 1954 |
| 2,687,418 | Sommer | Aug. 24, 1954 |
| 2,691,032 | Sommer | Oct. 5, 1954 |
| 2,721,856 | Sommer | Oct. 25, 1955 |
| 2,723,987 | Speier | Nov. 15, 1955 |
| 2,763,675 | Prochaska | Sept. 18, 1956 |
| 2,855,381 | Sommer | Oct. 7, 1958 |

FOREIGN PATENTS

| | | |
|---|---|---|
| 1,116,725 | France | Feb. 6, 1956 |
| 1,116,726 | France | Feb. 6, 1956 |

OTHER REFERENCES

Fieser et al.: "Organic Chemistry" (1944), Heath & Co., Boston, p. 170.

Kather et al.: "Ind. & Eng. Chem.," vol. 46, February 1954, pp. 381–4.

Petrov et al.: "Doklady Akad. Nauk" (U.S.S.R.), vol. 100, pp. 711–714, (1955).